UNITED STATES PATENT OFFICE.

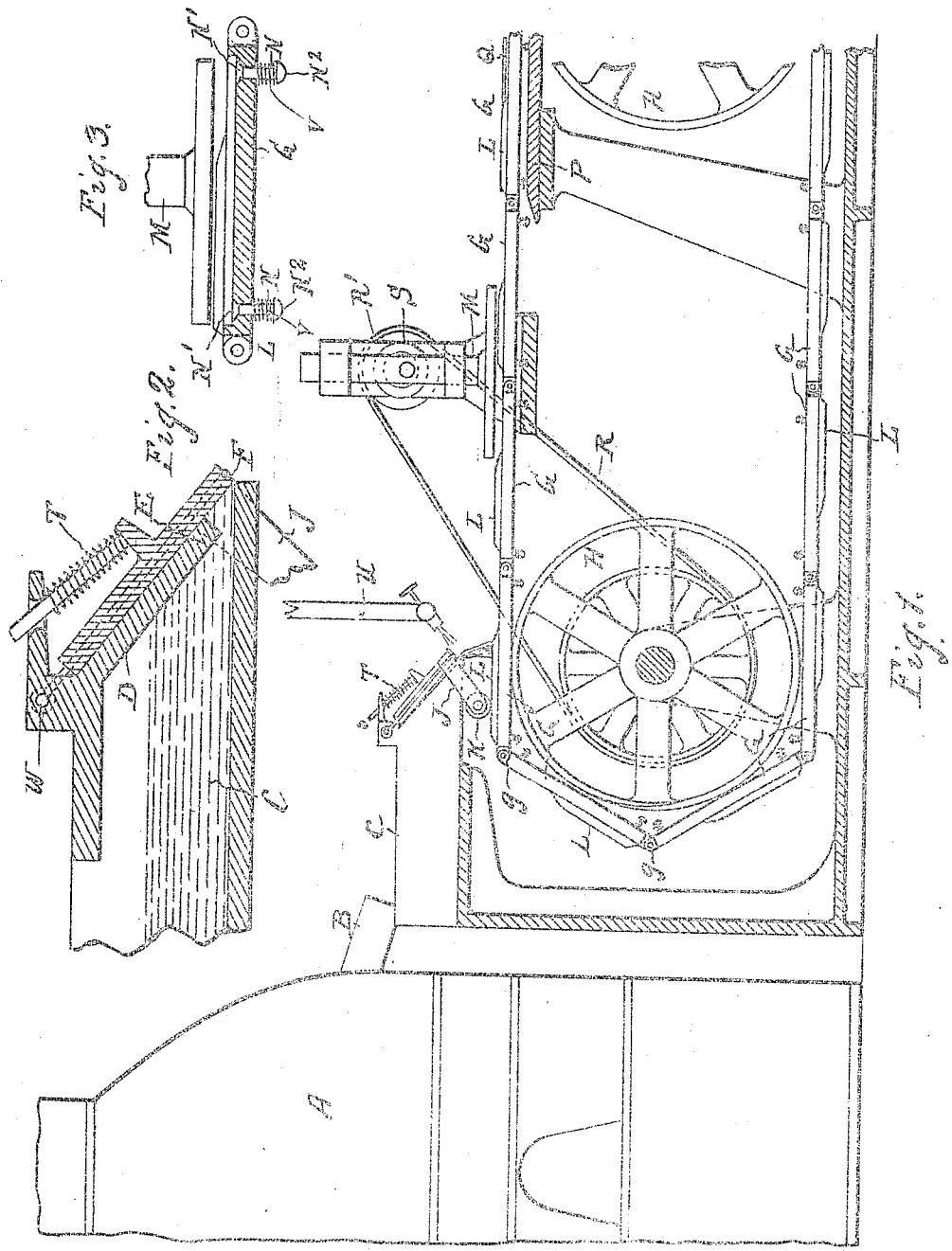

HARRY O. BISBING, OF DETROIT, MICHIGAN.

MACHINE FOR CASTING PLATE-GLASS.

1,363,450.    Specification of Letters Patent.    Patented Dec. 28, 1920.

Application filed March 8, 1919. Serial No. 281,341.

*To all whom it may concern:*

Be it known that I, HARRY O. BISBING, a citizen of the United States, residing at Detroit, county of Wayne, State of Michigan, have invented a certain new and useful Improvement in Machines for Casting Plate-Glass, and declare the following to be a full, clear, and exact description of the same, such as will enable others skilled in the art to which it pertains to make and use the same, reference being had to the accompanying drawings, which form a part of this specification.

My invention relates to glass making, especially that of plate glass, and consists in mechanism for delivering glass to containers from the furnace in consecutive order and the final delivery thereof after the glass is cooled whereby the casting of plate glass is substantially continuous.

In the drawings:

Figure 1 is an elevation partly in section of my device.

Fig. 2 is a sectional view of the apparatus for regulating the discharge and making it automatically intermittent.

Fig. 3 is a cross section of one of the platens and the manner in which the glass is held therein.

Similar letters refer to similar parts.

In the drawings A represents the furnace which is of the usual type and in which the glass is melted. As there is nothing new about the furnace it is only indicated and not described. B is the discharge spout therefrom about which there is nothing new. C is a receptacle for the glass by which it is delivered to the apparatus hereinafter described. This is shown in section so far as its operative parts are concerned in Fig. 2. It consists of a vat of refractory material the details of which are shown in vertical section in Fig. 2. Rigidly secured thereto or made a part thereof is an apron D which dams up the fluid glass and only allows it to flow in a stream thereunder at E. A valve passing across the orifice which is as wide as the receptacle for the glass marked F is raised in the manner hereinafter described to allow a certain amount of glass to be poured therefrom upon each platen and when each platen is full it travels forward to another platen which in turn is filled. This process is repeated.

The mechanism for accomplishing this result consists of vats or platens of refractory material G G hinged together at $g$ and passing around carrying rollers or drums H H which are driven by mechanism not shown and which is not of itself any part of my invention but which is common in the art. The platens form an endless chain of platens and when they are brought under the delivery receptacle C they lift the valve F by means of an arm J which terminates in a roller K and which is lifted by a projection L upon each platen to open the orifice F' and allow a certain amount of molten glass to flow into each platen G as it passes under the vat C. When sufficient glass has flowed into each of the platens G, the flap valve F is allowed to descend and stop a further flow until it is elevated again by the succeeding projection upon the next platen that in turn is filled also. The valve F is hinged at W. A plate M when a vat comes under it is allowed to descend at the proper instant and squeeze and push the molten glass into uniform thickness in the platen where it is thereafter cooled. The travel of the platens is intermittent to permit the action of the plate but is interrupted only momentarily. The mechanism for driving and causing this intermittent action being old and not a part of my invention I do not deem it necessary to describe it. In the bottom of each platen at each corner thereof there is a sliding bolt N with an enlarged head N'. The opposite ends $N^2$ of these bolts come in contact with a base P, the bolts are lifted against the tension of springs V V and in lifting they carry up the plate of glass, which is already cooled, in the position shown in Fig. 1 at Q. In this manner the glass is elevated above the platen in which it is formed and can be taken off or deposited by any convenient means. The plate M may be reciprocated by a band R on one of the driven wheels and as the action is only momentary due to the cam S attached to the band wheel R' it does not materially interfere or at least only momentarily with the movement of the platen as a band upon the driving wheels H.

The flap valve F is controlled by a spring T which forces it down against the plunger J and elastically resists its lifting by that plunger. It has sufficient force so that the valve F closes off the stream of molten glass in the vat or receptacle C in passing over the joints of the endless band of receptacles G G.

A gas jet U is provided whereby the glass on its delivery from said receptacle may be kept hot and plastic so as to flow easily and prevent chilling as it is delivered into the receptacles G.

The mode of operation of this device is sufficiently understandable from the foregoing description.

What I desire to claim is:

1. In combination with a reservoir adapted to contain molten glass, a discharge passageway leading from said reservoir, a chain-like series of platens adapted to receive glass from such discharge passageway, means for bringing each platen in place to receive glass, a flap valve closing the discharge passageway opened by each platen successively as the same is brought into receiving position, means for closing said flap valve after such platen has passed from its receiving position, and a tamping plate adapted to be brought into contact with the glass carried in each platen leveling and smoothing the same.

2. In combination with a molten glass reservoir, a discharge passageway from such reservoir, a chain-like series of platens, means for bringing such platens successively in position to receive glass from such discharge passageway, a flap valve normally closing such passageway, means for opening such valve by the positioning of each platen to receive glass, a leveling plate positioned above the run-way of traveling platens, means for automatically bringing such leveling plate in contact with the glass in each platen as the platen passes underneath such plate, and means for elevating the glass out of such platen.

3. In combination with a reservoir adapted to contain molten glass and provided with a discharge passageway, a valve normally closing such passageway, a chain-like series of glass receptacles adapted to pass successively underneath such discharge passageway and provided with means adapted to co-act with means carried by said valve to open the same during the time each receptacle is passing thereunder, a leveling plate positioned above the path of travel of said series of receptacles, a shelf spaced vertically from said leveling plate positioned underneath said chain-like series of traveling receptacles in such a manner that each receptacle will ride thereon as it passes underneath the leveling plate, means for bringing said plate automatically into contact with the glass carried in said receptacle during the time such receptacle is positioned thereunder.

In testimony whereof, I sign this specification.

HARRY O. BISBING.